Oct. 6, 1942.                F. J. JOHNS                 2,298,131
                           CAPACITOR MOTOR
                        Filed Nov. 27, 1940            2 Sheets-Sheet 1

WITNESSES:
C. J. Weller.
B. L. Zangwill.

INVENTOR
Francis J. Johns.
BY O. B. Buchanan
ATTORNEY

Oct. 6, 1942.   F. J. JOHNS   2,298,131
CAPACITOR MOTOR
Filed Nov. 27, 1940   2 Sheets-Sheet 2

WITNESSES:
C. J. Weller.
B. L. Zangwill.

INVENTOR
Francis J. Johns.
BY O. W. Buchanan
ATTORNEY

Patented Oct. 6, 1942

2,298,131

UNITED STATES PATENT OFFICE 2,298,131

CAPACITOR MOTOR

Francis J. Johns, Pittsburgh, Pa., assignor to Westinghouse Electric & Manufacturing Company, East Pittsburgh, Pa., a corporation of Pennsylvania Application November 27, 1940, Serial No. 367,361

3 Claims. (Cl. 172—279)

My invention relates generally to capacitor-start motors, and its primary purpose is to lower the cost and total size of a motor of this type by utilizing an economical arrangement of relatively small low-cost, dry, electrolytic capacitors in the starting connections, the capacitors being sufficiently small to be accommodated within the end brackets of the motor housing with no material increase in the overall size of these brackets.

It is an object of my invention to provide a motor housing for a split-phase motor, which can accommodate the added phase-displacement elements which are connected to the starting winding of the motor, and more particularly, the capacitor elements for a capacitor-start motor rated for operation at 220-230 volts and thereabouts, the capacitors being deliberately chosen for minimizing both the size of the brackets and the cost of the phase-displacement elements, of which they form the larger part.

It is a further object of my invention to provide a capacitor-start motor with a phase-displacement circuit including capacitors of low cost.

The low cost and small size of dry electrolytic condensers have made them desirable as starting capacitors for capacitor-start motors. However, the present distribution voltages of power lines and the voltages across the capacitors of capacitor-start motors designed for energization from such lines do not harmonize with the permissible rated voltages of starting capacitors of most economical construction with available materials. Inherent characteristics of dry electrolytic capacitors, due primarily to limitation of present manufacturing costs and methods, make it cheaper and better to utilize a plurality of capacitors of lower voltage ratings in series in the motor start circuit than a single capacitor of the equivalent series capacitance but having a higher voltage rating. However, such small capacitors for intermittent operation are very sensitive to over-voltages and quickly fail if the excess voltage across them is only a small fraction of the voltage for which they are designed. Various attempts, more or less satisfactory, have been made to apply small capacitors to starting service, but these generally involve specially wound motors, or special changeable connection means.

It is an additional object of my invention to employ relatively low-voltage-rated capacitors with a relatively high-voltage-rated capacitor-start motor, in an economical manner without subjecting the capacitors to over-voltages or abnormal duties which would quickly cause them to fail.

In accordance with my invention, a plurality of smaller capacitors are connected in series with the voltage across each limited by an additional resistance in series with the capacitors but of a value insufficient to disturb seriously phase displacements and currents required for starting the motor with a high starting torque. The capacitors are preferably matched as closely as possible, but because of the difficulty of obtaining capacitors which have exactly the same characteristics, a maximum of two capacitors are utilized for a 220–230 volt motor for which my invention is especially suitable, but a series connection of two small dry electrolytic capacitors with a resistor means for limiting the voltage across them provides a combination more economical than a single capacitor of higher voltage rating, or three smaller capacitors in series.

Further objects, features, and advantages of my invention, in addition to those more specifically mentioned above, will be apparent from the following description thereof which is to be taken in conjunction with the drawings, in which.

Figure 1:
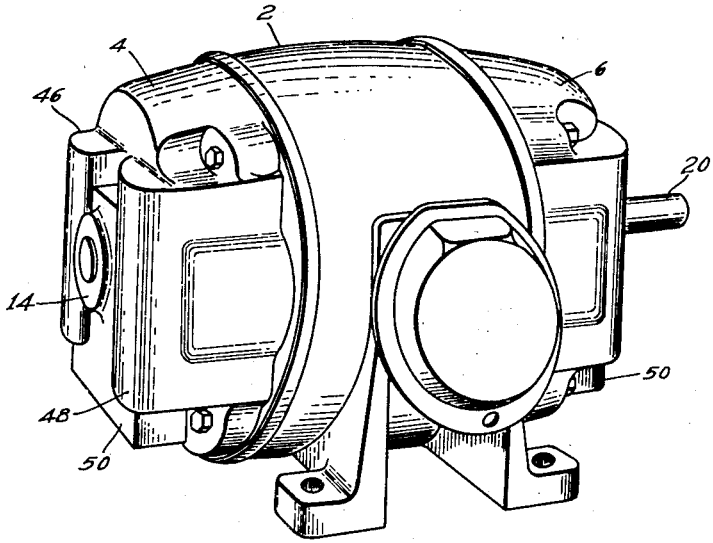
Figure 1 is a perspective view of a capacitor-start capacitor-run motor embodying my invention.
Figure 2:
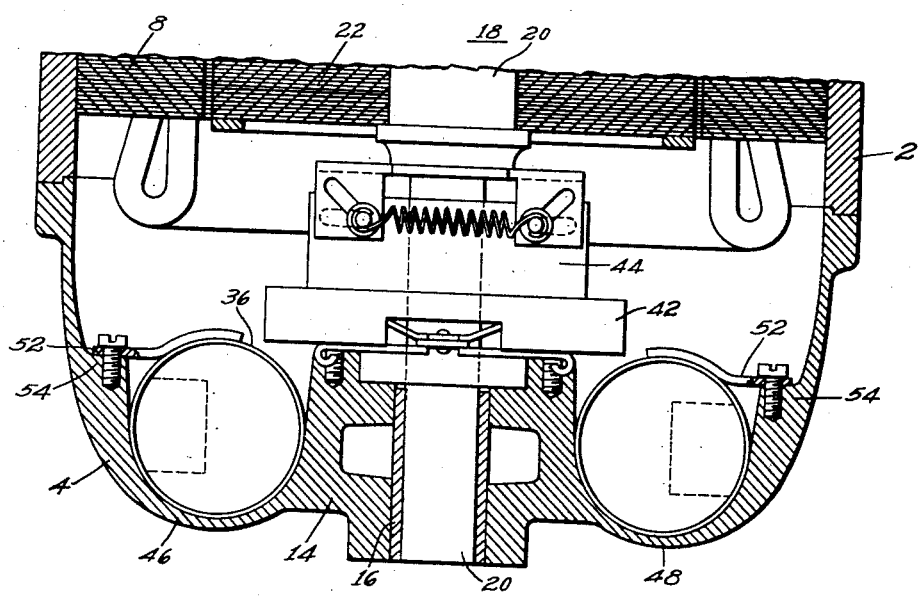
Fig. 2 is a somewhat diagrammatic, horizontal, axial, generally sectional view, of a part of the motor embracing an end bracket.
Figure 3:
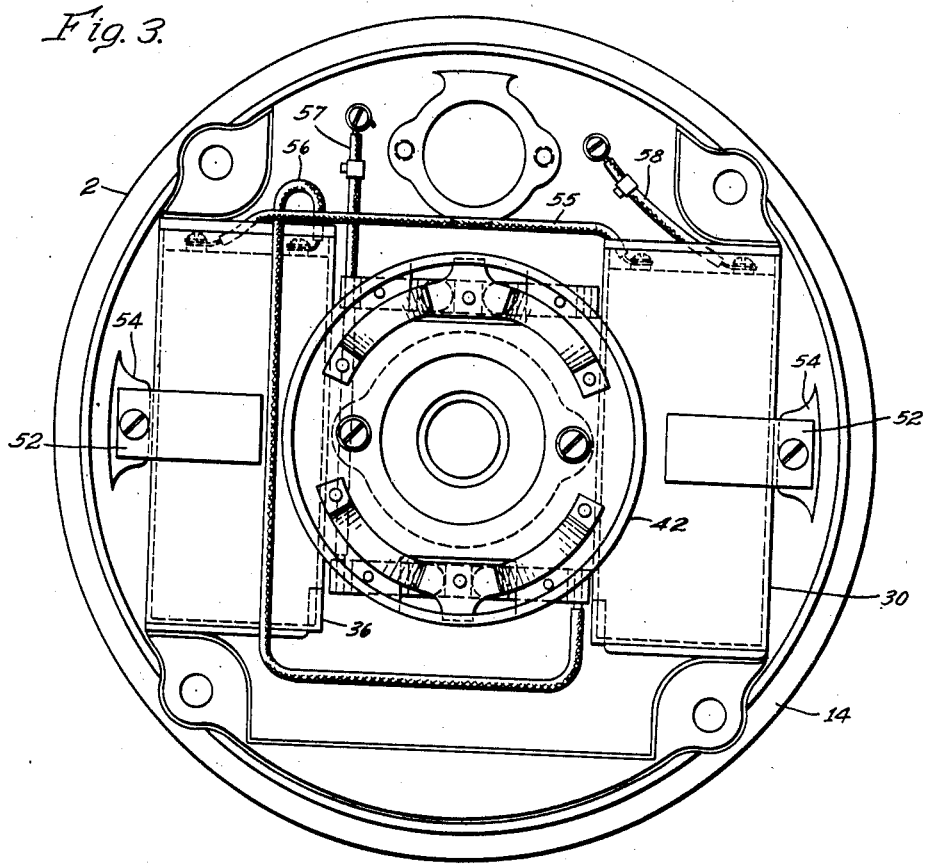
Fig. 3 is an inside elevational view of the end bracket having capacitors and a stationary contact element of a speed-responsive switch mounted therein.

In the accompanying drawings, I have shown my invention incorporated in a capacitor-start, capacitor-run motor comprising an open-ended, substantially cylindrical outer frame 2 to which the ends of motor end brackets 4 and 6 are fitted.

The frame 2 supports a stator having a suitable toothed laminated stator core 8 in which are placed the main winding 10 of the motor and the auxiliary winding 12 which is spacially displaced from the main winding the proper number of electrical degrees.

The end brackets 4 and 6 are provided with centrally disposed bearing hubs 14 which include suitable bearings 16 for supporting a rotor 18 which comprises a shaft 20 and a squirrel cage core 22. The stator and rotor may be constructed in accordance with the customary practice for split-phase motors of the type described.

Figure 4:
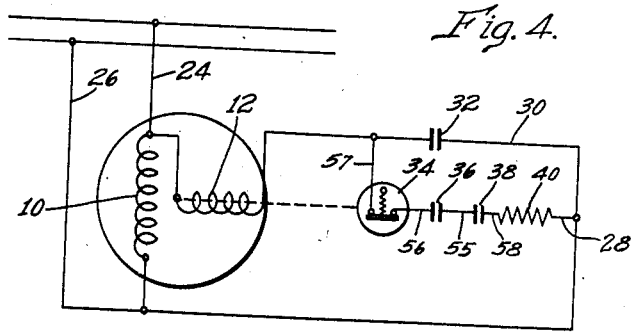
Fig. 4 is a wiring diagram showing schematically the connections utilized in the motor.

The motor has electrical connections somewhat as schematically shown in Figure 4 in which the reference characters 24 and 26 represent the terminal leads of the motor to which the power supply is connected, the main winding 10 being connected directly across these terminal leads. The auxiliary winding 12 has one end connected to an end of the main winding or a terminal lead 24 while the other end is connected to two circuits 28 and 30 which are connected in parallel, the circuit 28 being the starting circuit which is utilized during starting only, and the circuit 30 being utilized during both starting and running of the motor and hereinafter designated as the running circuit. The running circuit comprises a running capacitor 32, and the starting circuit comprises a centrifugal switch 34, a pair of capacitors 36 and 38, and a resistor 40 all connected in series.

The centrifugal switch 34 is indicative of any device controlled in response to the speed of rotation of the motor rotor 18, opening and closing the starting circuit at a predetermined fractional value of the rated speeds of the motor in the usual manner. I prefer to utilize a centrifugal switch of the type shown in detail and claimed in my copending application Serial No. 319,282, filed February 16, 1940. Generally, such a switch comprises a stationary contact-bearing element 42 secured to one of the bearing hubs of the motor and provided with suitable apertures permitting the motor shaft to pass into it. The switch further comprises a rotatable element 44 secured to and rotating with the shaft 20 for cooperating with the stationary contact-bearing element 42 for opening a pair of normally closed contacts, when the rotor, in starting, has attained a predetermined speed and for reclosing the contacts when the rotor speed has fallen a predetermined amount from its operating speed.

Since it is a purpose of my invention to provide a combination of capacitors of minimum cost, the starting capacitors 36 and 38 are of the so-called dry electrolytic type which comprise, as is well known, compactly spirally wound sheets of film-forming metal such as aluminum between layers of absorbent papers, and sealed in a cylindrical can. The absorbents are impregnated with a suitable electrolyte, and a film of metal alternates with a layer of paper, two layers of each being used in the cheaper capacitors. Capacitors of this type can be successfully used for intermittent operation such as occurs with a capacitor-start motor provided that they are not subjected to over-voltages while they are energized.

Dry electrolytic condensers have comparatively high power-factor and are, therefore, not adapted for continuous energization because of the large amount of heat generated in them in comparison to their size which is deliberately made as small as possible. In the present state of their development, such capacitors should not be subjected to more than 130 volts, and preferably even less. To obtain capacitors capable of withstanding higher voltages would require an increase in size and cost, or the use of some other form of capacitor. In accordance with my invention, small dry electrolytic capacitors are applied to a motor for operation at 220-230 volts, with the voltage across them limited. In my invention I propose to limit the voltage by the insertion of a resistor of such value that it does not appreciably alter the starting current in the starting circuit 28 or the phase displacement of the starting current in the circuit including auxiliary winding 12, with respect to the phase of the current of the main winding 10.

In order to illustrate the advantages of my invention, it may be assumed that the schematic diagram of Fig. 4 represents the connections for a 1½ horsepower, 60 cycle, 220 volt motor rated at 1750 revolutions per minute. At full load and full speed of the motor, the centrifugal switch is open and the voltage across the parallel running circuit 30 is 330 volts while the current is approximately 5 amperes with a capacitor having a capacity of 40 microfarads. A capacitor for such running constants is readily available and one may be utilized having its absorbent impregnated with chlorinated diphenyl.

At the initial starting of the motor, the switch 34 is closed and a voltage of 282 volts appears across the parallel circuits 28 and 30. If two dry electrolytic condensers only were employed in the starting circuit 28 it is clearly evident that the voltage across each of them would be somewhat above 140 volts, a value which would quickly cause them to fail. By adding the resistor 40 which need be only 1.65 ohms and rated for the same intermittent operation as the capacitors 36 and 38, the voltage across each of the capacitors is limited to safe values. This combination of two capacitors and a resistor in series, which does not absorb a relatively large voltage drop, provides a starting circuit which is economical, reliable and very satisfactory in use. It is important that the voltage across the resistor be kept low with respect to that across the capacitors so that neither the starting current in the starting circuits, or its phase-displacement will be adversely affected in any significant degree.

The cost of two electrolytic capacitors rated at the lower voltage and the resistor is considerably less than that of a single capacitor of the same equivalent capacity as the two series-connected electrolytic capacitators, but rated to withstand the high voltage appearing across the starting circuit. By providing the two capacitors 36 and 38 and resistor 40 in series, I have limited the voltage drop across each of the capacitors to safe operating values while the voltage drop across the resistor in the specific example before mentioned is but approximately 23 volts, a value sufficient to limit the voltage across each of the dry electrolytic capacitors to a safe operating value, but insufficient to appreciably affect the starting characteristics of the motor.

By utilizing the small capacitors, I obtained the further advantage of being able to accommodate all the extra elements within the end brackets 4 and 6 of the motor itself. To this end, each of the end brackets is provided with a pair of substantially parallel substantially semi-cylindrical seats 46 and 48 which are formed by somewhat dishing the portion of the end brackets on each side of a bearing hub, as shown in the perspective view of Fig. 1. The end brackets are formed somewhat square below the bearing hubs to provide a somewhat prismatic portion 50 which may be opened at the bottom to provide for ventilation of the motor, or which may be closed if the motor is to be encased.

The bracket 4 accommodates the capacitors 36 and 38, one in each of the cylindrical seats 46 and 48. These capacitors, being of the dry electrolytic type, are relatively small for their size, each being approximately 282 mfd. for the specific motor hereinbefore described, and do not interfere with operation of the rotating element 44 of the centrifugal switch mounted on the motor shaft. Clamps 52 are bolted to projecting lugs 54 forming part of the end bracket, to hold the capacitors in place.

The end bracket 6 is similar in construction to the end bracket 4 but does not embrace a centrifugal switch. In one of the seats of the end bracket 6 may be mounted the running capacitor 32 or, if it be desired to utilize parallelly-connected capacitors for the running capacitor, they can be secured in position in the two seats of the bracket 6. However, a single capacitor has been found satisfactory and the other seat of the bracket 6 can be utilized to accommodate the resistor 40 although this resistor can be mounted with a capacitor in a single seat.

Within the bracket 4, I have provided a connection 55 serially connecting the capacitors 36 and 38, a connection 56 connecting the capacitor 36 to one contact of the centrifugal switch, a connection 57 from the other contact of the centrifugal switch and a connection 58 from the other terminal of the condenser 38 which is to be connected to the resistor 40.

While I have described my invention with reference to a specific example for a particular motor with electrolytic capacitors connected in series in a capacitor-start circuit, it is obvious that the teachings of my invention are of general application.

I claim as my invention:

1. A single-phase capacitor-start, capacitor-run motor comprising a pair of terminal leads for connection to an alternating-current power supply; a rotor; a stator having a main winding connected across said terminal leads, and an auxiliary winding having one end connected to one of said terminal leads; a starting circuit connected between the other end of said auxiliary winding and the other of said terminal leads, said starting circuit including in series: a switch means operated in response to the rotor speed for opening the starting circuit when the rotor speed has reached a predetermined value after starting, a pair of dry electrolytic capacitors having a permissible applied voltage of less than one-half the voltage across said starting circuit during starting of said motor, and a resistance means.

2. A single-phase capacitor-start, capacitor-run motor comprising a pair of terminal leads for connection to an alternating-current power supply of about 220 volts; a rotor; a stator having a main winding connected across said terminal leads, and an auxiliary winding having one end connected to one of said terminal leads; a starting circuit connected between the other end of said auxiliary winding and the other of said terminal leads, said starting circuit including in series: a switch means operated in response to the rotor speed for opening the starting circuit when the rotor speed has reached a predetermined value after starting, a pair of dry electrolytic capacitors having a permissible applied voltage of less than one-half the voltage across said circuit during starting of said motor, and a resistance means; and a running circuit including a running capacitor connected between said other end of said auxiliary winding and said other of said terminal leads.

3. A single-phase, split-phase motor comprising a frame and end brackets therefor; a stator within said frame having a main winding and an auxiliary winding; a rotor comprising a shaft and a core on said shaft; said end brackets each having bearing means for rotatably supporting said shaft, the interior of each of said brackets being provided with a pair of substantially semi-cylindrical depressed seats, one on each side of the bearing means of the bracket; a pair of substantially cylindrical dry electrolytic starting capacitors in the seats of one of said brackets; a centrifugal switch comprising a stationary element secured to said one bracket, and a rotatable element secured to said rotor; a resistor; connection means connecting said resistor, said starting capacitors and said switch in series with said auxiliary winding, a running capacitor in a seat of the other of said brackets, said running capacitor being connected parallel to the circuit composed of said resistor, starting capacitors and switch in series.

FRANCIS J. JOHNS.